This application is a continuation-in-part of my copending application, Serial No. 252,084, filed January 17, 1963, now abandoned, for a poultry house cleaner.

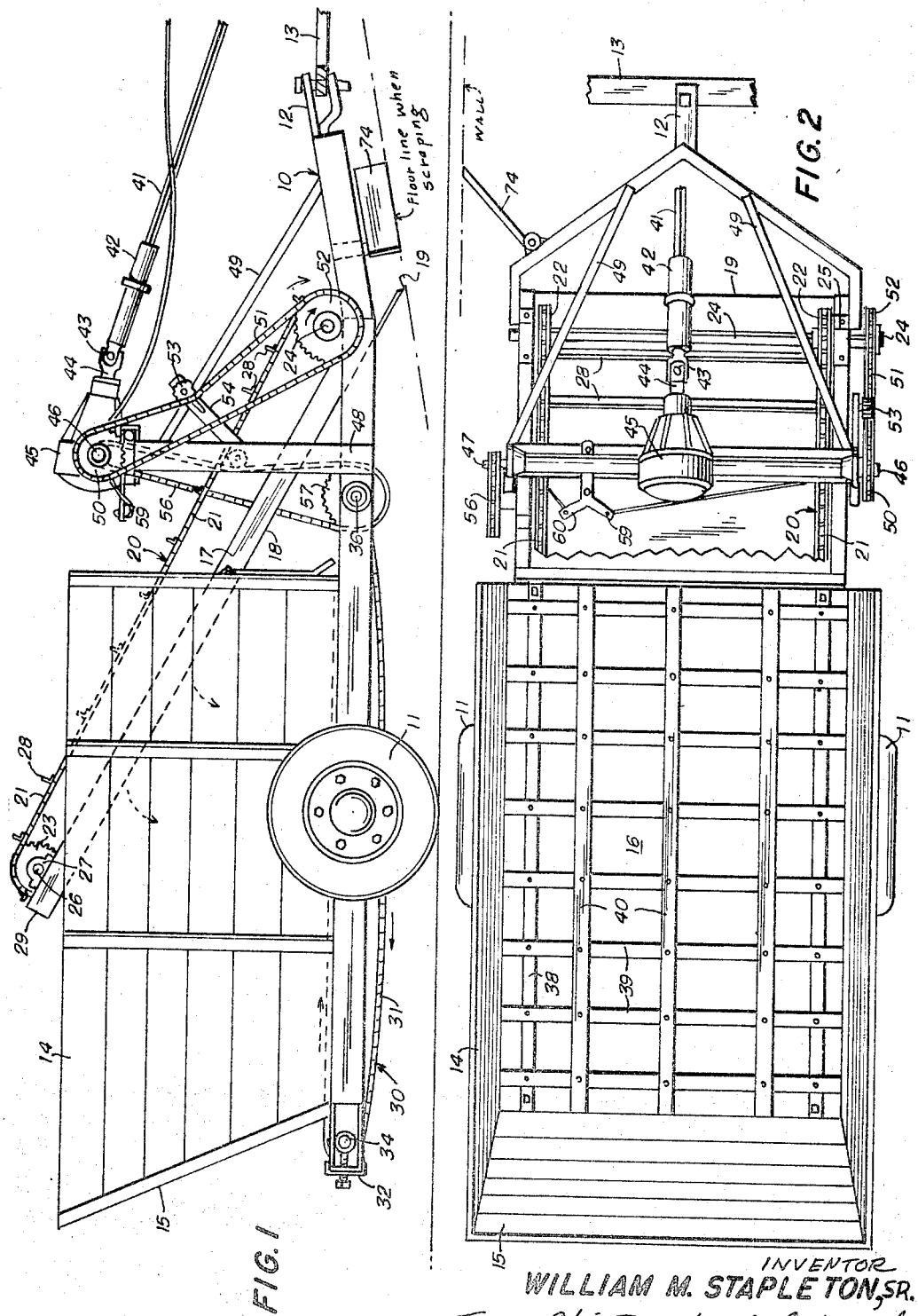

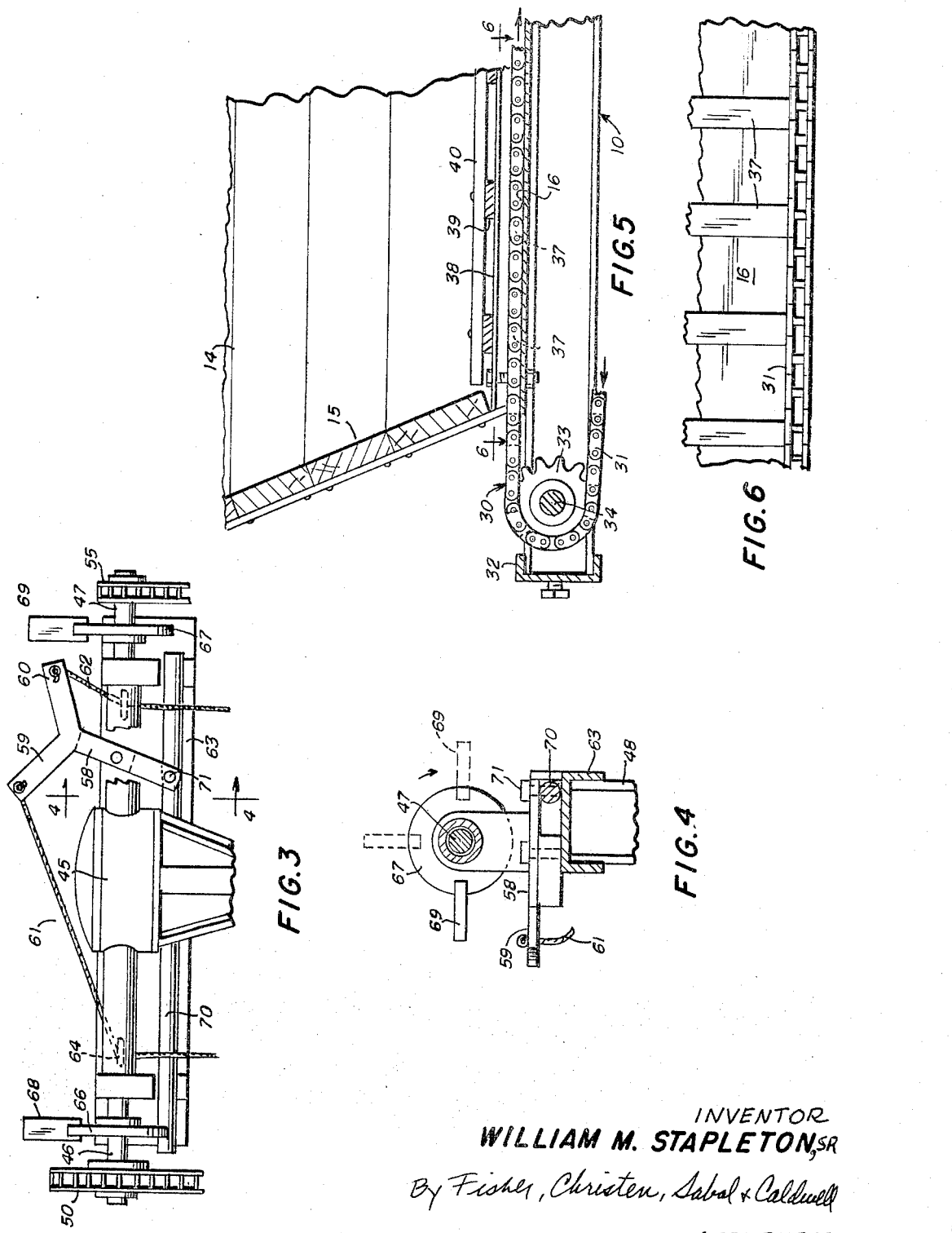

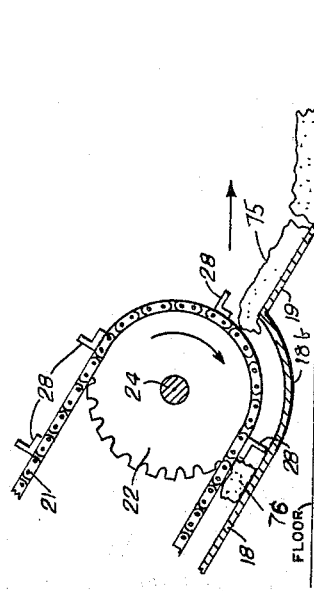
INVENTOR
WILLIAM M. STAPLETON
BY Fisher, Christen, Sabal & Caldwell
ATTORNEYS 3,263,257
POULTRY HOUSE CLEANER
William M. Stapleton, Sr., Rte. 1, Lumber City, Ga.
Filed Feb. 19, 1965, Ser. No. 434,052
3 Claims. (Cl. 15—93)

This invention relates primarily to agricultural implements, and more particularly to a towed vehicle for scraping up materials from the ground or floor for loading into the vehicle for transport to another area where it is to be dispensed by an unloading mechanism.

One object of the invention is to provide a vehicle having power operated loading and unloading conveyors which can be operated by a towing vehicle provided with the usual power take-off means.

Another object of the invention is to provide a loading and unloading implement having a ground engaging scraper means which can be raised or lowered by means of a conventional elevating drawbar usually provided on agricultural tractors.

Still another object of the invention is to provide a novel form of mechanisms for scraping up caked and dried manure which has been hardened on a floor or other surface and breaking it into smaller sizes for use as a fertilizing material.

A further object of the invention is to provide a towed vehicle having loading and unloading conveyors operated by the power take-off of a towing vehicle and also provided with a ground engaging scraper means which can be raised and lowered by the drawbar means of the towing vehicle, and in which all of the controls may be operated by the driver of the towing vehicle.

Other objects and advantages will be evident to those skilled in the art after reading the following specification in connection with the attached drawings.

In the drawings; FIG. 1 is a side elevation of a preferred form of fertilizer collector and dispenser constructed in accordance with the disclosure of the present invention;

FIG. 2 is a plan view of the same;

FIG. 3 is a plan view, on a slightly enlarged scale, of the power-delivering mechanism for the conveyors;

FIG. 4 is a cross-section taken on the line 4—4 of FIG. 3;

FIG. 5 is a fragmentary cross-section in elevation of the rear end of the interior of the vehicle body;

FIG. 6 is a cross-section taken on the line 6—6 of FIG. 5, and;

FIG. 7 is a fragmentary vertical cross-section of the intake end of the loading conveyor.

Referring now to the drawings in detail, the numeral 10 indicates generally an elongated generally horizontally extending framework supported medially of its length upon a pair of ground-engaging wheels 11. A detachable hitch means 12 is provided at the front end of the framework for universally swivelling connection with a horizontally extending drawbar 13, of a towing vehicle such as a farm tractor (not shown). The towing vehicle is preferably provided with conventional power-operated means for raising and lowering the drawbar, while the connection between the hitch and the drawbar is of conventional construction such that by raising and lowering the drawbar, the entire framework 10 may be tilted in a vertical plane about the axis of the wheels 11.

Situated towards the rear end of the framework so that the load will be fairly evenly distributed forwardly and rearwardly of the wheels 11, is a body having generally parallel side walls 14 and a rear wall 15, and a substantially imperforate floor 16.

A pair of side rails 17 extend angularly upwardly along the interior of each side of the body, the lower ends of these rails being attached at the forward end of the framework 10, the upper ends of the rails extending at least as far as a medial portion of the top of the side walls 14.

A loading conveyor means, indicated generally by the numeral 20, consists of a pair of endless chains or belts 21, supported at their lower ends by sprocket wheels 22 and at their upper ends by sprocket wheels 23. The sprocket wheels 22 are fixed to a drive shaft 24 supported on the framework 10 as by means of trunnions 25, while the upper sprocket wheels 23 are mounted on shaft 26 carried by trunnions 27. The chains 21 carry a series of transversely arranged impellers or vanes 28 which may be conveniently fabricated of ordinary angle iron, and are spaced from each other in the direction of travel of the conveyor. The sprockets 22 and 23, when in operation, rotate in a clockwise direction as viewed in FIG. 1.

Disposed in an upwardly inclined direction is a substantially flat imperforate surface 18 extending between the side rails 17 below the lower reach of chain conveyor 21, positioned to slidably support the vanes 28 during a portion of their upward travel from the sprocket 22, the upper margin 18a of this surface terminating at a point adjacent the forward wall 15a of the vehicle. It should also be observed that the lower end 18b (see FIG. 7) of the imperforate surface is curved upwardly along a path concentric with a portion of the path of travel of the vanes 28 as they pass downwardly around sprocket 22. Finally, the surface terminates in an inclined leading edge 19 which projects downwardly below the framework 10 to provide a scraping edge when the framework is supported in a lowered position by means of the drawbar 13.

An unloading conveyor, indicated generally by the numeral 30, includes a pair of transversely spaced endless chains 31, supported at the rear end 32 of the frame by sprocket wheels 33 mounted on the shaft 34 which is rotatably supported on the framework by suitable bearings (not shown). The forward ends of the chains 31 are supported by sprockets 35 which are fixed to a drive shaft 36, rotatably supported on the framework 10 just adjacent the front of the side walls 14 on suitable bearings (not shown). The chains 31 are provided at spaced intervals with transversely extending vanes 37 which, in this case, may be composed of flat strips of metal. Sprockets 35 are also driven in a clockwise direction so that the vanes 37 moving along the upper course of the conveyor slide on the upper surface of the floor 16. Thus, when the unloading conveyor is in operation, the material in the body will be discharged to the ground from the front end of the conveyor.

Positioned within the body of the vehicle and preferably spaced slightly above the vanes 37 are a pair of longitudinally extending horizontal support members 38 and these support a number of transversely extending slats 39 which in turn provide support for the longitudinally extending slats 40. The slats 38 and 39 are preferably spaced fairly widely apart as compared to their thickness and together they provide a sort of grid which cushions the impact of material delivered from the loading conveyor into the vehicle body, and also prevent overloading and clogging of the unloading conveyor.

Means is also provided for selectively actuating the two conveyors on the vehicle from the usual power take-off (not shown) usually provided on the towing vehicle. For this purpose an elongated shaft 41 is provided with suitable coupling means for the power takeoff at one end, while the other end is splined so as to be axially slidably, but nonrotatably, connected with a sleeve 42. The sleeve is connected by a universal joint 43 with the input shaft 44 of a selective power distributing mechanism such as a conventional differential gear mechanism (not shown) contained within the housing 45.

The differential gear mechanism (or whatever type of selective power distributing mechanism is employed) is provided with two output shafts 46 and 47 disposed at opposite ends of the housing 45, while the housing itself is preferably supported adjacent the forward end of the framework 10 by means of a pair of pedestals 48, suitably reinforced as by means of the braces 49.

The driving shaft 46 is provided with a sprocket 50 and an endless chain 51 provides a driving connection between the sprocket 50 and a sprocket 52 affixed to shaft 24 for driving the unloading conveyor. An idler 53, mounted on the adjustable link 54, may be used to maintain tension in chain 51. The other shaft 47 is provided with a sprocket 55 which is connected by an endless chain 56 with the sprocket wheel 57 on drive shaft 36.

The mechanism for selectively actuating either of the shafts 46 and 47 is shown in detail in FIGS. 3 and 4, wherein it will be seen that a Y-shaped actuating lever 58 is pivotally mounted on a cross-brace 63 extending between the pedestals 48. The divergent arms 59 and 60 are respectively connected to the lengths of rope 61 and 62 which extend forwardly a distance sufficient to be accessible to the operator of the towing vehicle when seated in the driving position. The rope end 61 is carried forwardly through an eye 64 while the rope end 62 is carried through an eye 65, both of these eyes being attached to the cross-brace.

Each of the shafts 46 and 47 are provided, adjacent their driving sprockets respectively, with flanged portions 66 and 67, and each of these flanges is also provided with a radially projecting stop member 68 and 69 respectively. A disabling rod 70, pivotally connected at 71 with the lever 58, is supported by guides 72 and 73 on the cross-brace for longitudinal sliding movement whereby the respective ends of this rod may be positioned within the path of movement of the respective stop members 68 and 69 as can be seen in FIG. 4.

It will thus be understood that by manipulation of the control ropes the lever 58 can be shifted to move the disabling rod 70 into the path of one or the other of the stop members 68 or 69. As shown in FIG. 3 the rod is positioned to intercept stop 68 and it will be evident from an understanding of the well-known principles of differential gearing that when the stop 68 engages the rod 70, shaft 46 will not rotate further and therefore any rotation transmitted to the gearing by the tractor power take-off through the drive shaft 41 will be transmitted to the shaft 47 to drive the unloading conveyor. Conversely, if the disabling rod 70 is shifted to a position to intercept the stop 69, any further rotation of the drive shaft 41 will be transmitted entirely to the shaft 46 to drive the loading conveyor.

Furthermore, it will be understood that when it is desired to load the material into the body of the vehicle with the loading conveyor in operation, the operator of the towing vehicle will lower the drawbar 13 so that the scraper 19 will scrape the ground or other surface, such as the floor of a poultry house, over which the vehicle is being towed.

An additional feature which is particularly useful when scraping material from a surface adjoining the wall of a building, is the provision of the deflecting plate 74, which is attached to the underside of the frame 10 to extend angularly outwardly in a horizontal direction beyond the line of travel of the vehicle wheel 11 on the same side of the vehicle.

In operation, with the scraper 19 lowered for contact with the floor of a poultry house, or other surface, as shown in FIG. 7, the dried and relatively brittle manure is first lifted as a result of forward movement of the vehicle in the form of relatively large cakes, indicated by numeral 75, which slide upwardly until they come in contact with the lower end of the loading conveyor. Since the plane of the scraper is substantially in alignment with the axis of the sprocket 22, or only slightly below it, successive vanes 28 which are carried downwardly and around the periphery of the sprocket come into engagement with the edge of the cake 75 at substantially right angles to it so as to break it up into smaller pieces 76 which are carried around on the curved portion 18b and upwardly on the straight portion 18 of the loading conveyor floor. In order to keep up with the forward movement of the vehicle, the chains 21 must be driven at a relatively high rate of speed.

Since the upper end 18a of the conveyor floor is close to the front of the body, material is initially deposited on the front portion of the vehicle floor. However, as soon as the collected material reaches up to the level of the lower reach of chains 21, the material will be carried further and further to the rear, as it obviously cannot build up above the level of the loading conveyor itself. In effect, the deposited material to the rear of the upper end of conveyor floor 18 becomes itself an extension of the floor over which the vanes 28 carry the material until the body of the vehicle is filled.

Obviously, when the vehicle is being towed to the location where it is desired to spread the material contained therein the operator of the vehicle will disconnect the clutch to the power take-off and will elevate the drawbar 13 to raise the scraper and the deflector plate from the ground.

Finally, when the material is to be spread it is merely necessary for the operator to pull the end of the rope 61 to shift the disabling bar 70 to the right (as seen in FIG. 3) and to reconnect the power take-off to drive the unloading conveyor. It will be evident that all of these operations can be performed by the operator without leaving his position on the tractor or towing vehicle.

Having disclosed one form in which the invention may be practiced, it will be evident that modifications and improvements can be made by those skilled in the art which would come within the scope of the invention.

I claim:

1. In a device of the character described for use with a towing vehicle having vertically movable drawbar means and power takeoff means, the combination including a body supported by a pair of ground-engaging wheels, hitch means secured to said body spaced forwardly from said wheels for detachable engagement with a drawbar means, loading conveyor means provided at its leading edge with forwardly directed scraper means fixedly secured to said body forwardly of said wheels, unloader conveyor means, and power transmitting means, said power transmitting means including coupling means for detachable engagement with said power takeoff means and also including differential gear means having a pair of output shafts connected to said conveyor means, and means to selectively prevent rotation of each shaft to insure rotation of the respective other shaft, said coupling means being mounted on said body for relative vertical movement, whereby the scraper means may be raised or lowered by a drawbar means while the coupling means is engaged with the power takeoff means.

2. The invention as defined in claim 1, wherein said means to selectively prevent rotation of the shafts includes a pivotally mounted arm movable between two positions, a pair of stop means connected respectively with each of said shafts, means connecting said arm with said stop means for respectively engaging one of the stop means and disengaging the other stop means alternatively when moved to one or the other of said two positions, and means for manually controlling said arm from a position on the towing vehicle.

3. An implement for collecting material deposited on a floor in semihardened layer, comprising a body mounted on a pair of wheels having a floor and an upright front wall, an inclined conveyor floor having a discharge end terminating inside the body adjacent the front wall, and an intake end provided with a forwardly directed scraper plate for removing said deposited material, conveyor means comprising elongated endless chain means provided with longitudinally spaced vanes mounted transversely on said chain means; for coacting with said conveyor floor to move material to the discharge end thereof and to move the vanes in an upwardly inclined straight line beyond the termination of said floor to carry material toward the rear of the body as the material collects below the conveyor, said chain means being supported at opposite ends by a pair of sprocket means mounted on horizontal axes, one of the sprocket means being positioned adjacent the intake end of the conveyor floor, said scraper plate being disposed generally in a plane in alignment with the axis of said one sprocket means, the intake portion of the conveyor floor merging with the discharge end of the scraper plate and being curved downwardly thereafter and thence upwardly towards the discharge end of the floor, said one sprocket means being arranged for moving the vanes downwardly adjacent the discharge end of the scraper plate.

References Cited by the Examiner

UNITED STATES PATENTS

| | | | |
|---|---|---|---|
| 2,546,907 | 3/1951 | Sherwood | 37—8 X |
| 2,959,266 | 11/1960 | Varnadore et al. | 198—7 |
| 3,043,030 | 7/1962 | Wisbey | 198—7 |
| 3,158,137 | 11/1964 | Summerour | 15—84 X |

GERALD M. FORLENZA, *Primary Examiner.*

A. J. MAKAY, *Assistant Examiner.*